US011427242B2

(12) United States Patent
Reichard et al.

(10) Patent No.: US 11,427,242 B2
(45) Date of Patent: Aug. 30, 2022

(54) ANTI-ROTATION FEATURE FOR STEERING SYSTEM ENERGY ABSORPTION ASSEMBLY

(71) Applicant: Steering Solutions IP Holding Corporation, Saginaw, MI (US)

(72) Inventors: Ben D. Reichard, Saginaw, MI (US); Nicholas M. Messing, Freeland, MI (US); Dusten L. Dittenbir, Midland, MI (US); Jason L. Myers, Mt. Morris, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 261 days.

(21) Appl. No.: 16/902,435

(22) Filed: Jun. 16, 2020

(65) Prior Publication Data

US 2021/0387661 A1 Dec. 16, 2021

(51) Int. Cl.
*B62D 1/181* (2006.01)
*F16H 25/20* (2006.01)
*B62D 1/19* (2006.01)

(52) U.S. Cl.
CPC .............. *B62D 1/181* (2013.01); *B62D 1/195* (2013.01); *F16H 25/20* (2013.01)

(58) Field of Classification Search
CPC .......... B62D 1/181; B62D 1/195; F16H 25/20
See application file for complete search history.

(56) References Cited

U.S. PATENT DOCUMENTS

| 10,807,630 | B2 * | 10/2020 | Caverly | B62D 1/192 |
| 10,807,632 | B2 * | 10/2020 | Perichon | B62D 1/195 |
| 11,167,785 | B1 * | 11/2021 | Beach | B62D 1/181 |
| 2015/0028574 | A1 * | 1/2015 | Meyer | F16F 15/021 |
| | | | | 280/775 |
| 2015/0232117 | A1 * | 8/2015 | Stinebring | B62D 1/181 |
| | | | | 74/493 |
| 2020/0172147 | A1 * | 6/2020 | Caverly | B62D 1/195 |

FOREIGN PATENT DOCUMENTS

| CN | 106794858 A | * | 5/2017 | ............. B62D 1/185 |
| WO | WO-2016110336 A1 | * | 7/2016 | ............... B62D 1/16 |

* cited by examiner

*Primary Examiner* — Drew J Brown
(74) *Attorney, Agent, or Firm* — Dickinson Wright PLLC

(57) ABSTRACT

A steering column assembly includes a column jacket. The column assembly also includes a drive bracket movable in a telescope direction, the drive bracket coupled to the column jacket to move the column jacket in the telescope direction. The column assembly further includes a plate operatively coupled to the column jacket and operatively coupled to the drive bracket, the plate defining a slot extending from an open end of the plate. The column assembly yet further includes a tab disposed within the slot to prevent pivoting of the drive bracket.

16 Claims, 3 Drawing Sheets

ANTI-ROTATION FEATURE FOR STEERING SYSTEM ENERGY ABSORPTION ASSEMBLY

FIELD OF THE INVENTION

The embodiments described herein relate to vehicle steering systems and, more particularly, to an anti-rotation feature for a steering system energy absorption assembly.

BACKGROUND

A steering column assembly of a vehicle may be adjustable in a rake (tilt) direction and/or in a telescoping direction. Each of these adjustments may be carried out with respective power assemblies or mechanisms. Typical telescope drive systems may include a telescope drive bracket mounted to a column jacket. The telescope drive system is mounted rigidly at one location, while another location moves in a linear direction, thus driving the component it is fixed to, resulting in a desired telescope travel.

During telescope motion of a power adjustable column with a telescope drive actuator, the actuator provides motion to a telescope drive bracket that transfers the motion through operative connection to a weld plate (via a screw and energy absorbing rivet) to produce movement of the upper jacket assembly. Due to the unique loading direction of the telescope actuator, it can cause the telescope drive bracket to pivot about the screw. This pivoting motion may apply a side-to-side force vector to the energy absorbing rivet. This back and forth load application can apply fatigue loads to the energy absorbing rivet which may reduce the performance of the energy absorbing rivet or separate it completely from its mating components, leading to a degradation in collapse performance.

SUMMARY

According to one aspect of the disclosure, a steering column assembly includes a lower jacket. The column assembly also includes an upper jacket in telescoping engagement with the lower jacket. The column assembly further includes a telescope actuator assembly. The column assembly yet further includes a drive bracket operatively coupled to, and translated by, the telescope actuator assembly, the drive bracket having a base portion coupled to the upper jacket to move the upper jacket in a telescope direction relative to the lower jacket. The column assembly also includes a plate coupled to an outer surface of the upper jacket and disposed between the base portion of the telescope drive bracket and the upper jacket, the plate defining a slot extending from an open end of the plate. The column assembly further includes a tab extending radially inwardly from the drive bracket and disposed within the slot to prevent pivoting of the drive bracket.

According to another aspect of the disclosure, a steering column assembly includes a column jacket. The column assembly also includes a drive bracket movable in a telescope direction, the drive bracket coupled to the column jacket to move the column jacket in the telescope direction. The column assembly further includes a plate operatively coupled to the column jacket and operatively coupled to the drive bracket, the plate defining a slot extending from an open end of the plate. The column assembly yet further includes a tab disposed within the slot to prevent pivoting of the drive bracket.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, illustrated are embodiments of an anti-rotation feature that prevents pivoting of a telescope drive bracket, while avoiding separation of associated components during operation.

Figure 1:
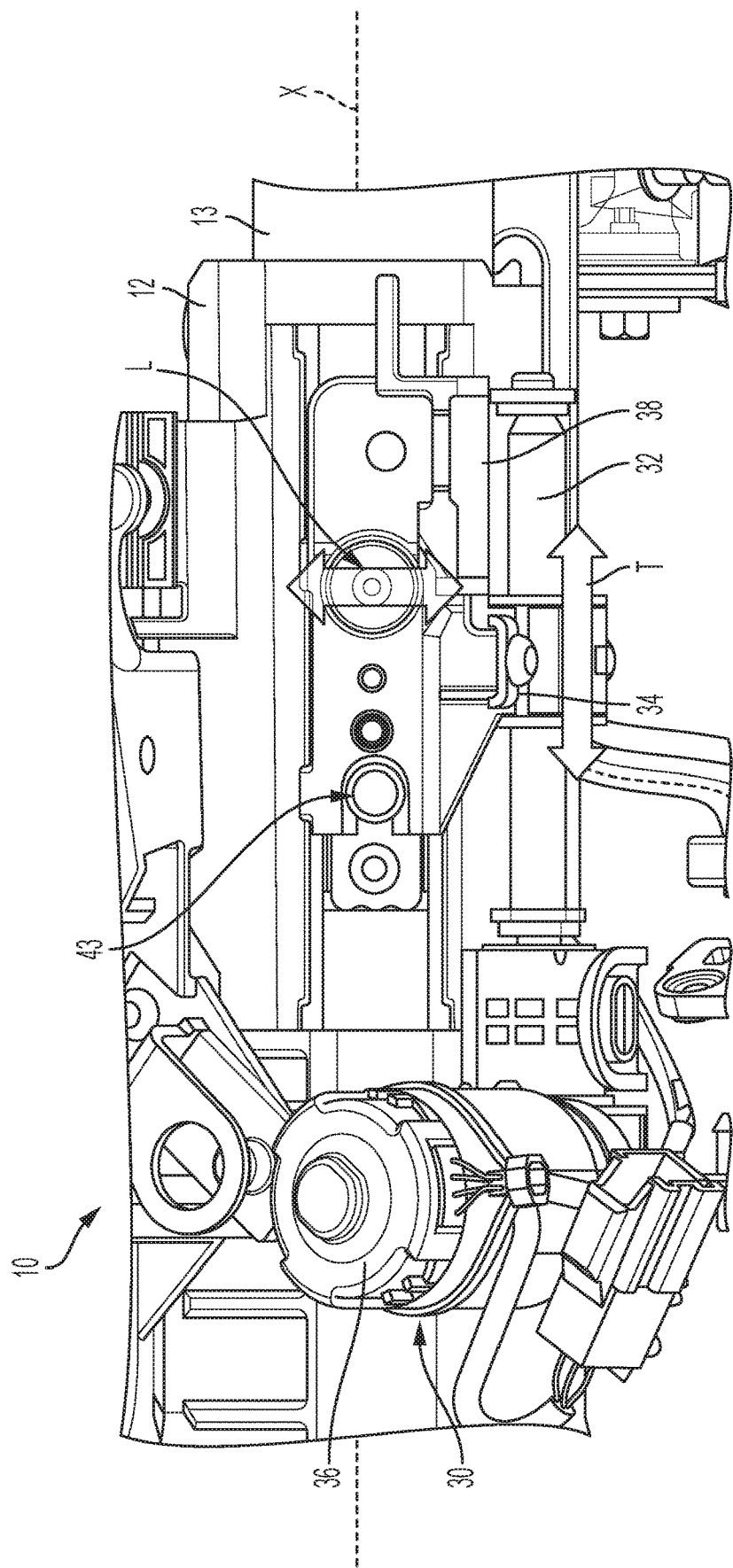
FIG. 1 is an elevational view of a telescope actuator assembly of a steering column assembly.

FIG. 1 illustrates a steering column assembly generally indicated with numeral 10. The steering column assembly 10 is for a vehicle and extends along a longitudinal axis X. The steering column assembly 10 may be adjustable in a telescopic direction generally parallel with the longitudinal axis X (i.e., adjustable along the longitudinal axis X), and may be adjustable in a rake/tilt direction in some embodiments. The steering column assembly 10 includes a lower jacket 12, an upper jacket 13, and a steering shaft 14 (shown in FIG. 2) extending along the longitudinal axis X. The steering shaft 14 and the upper jacket 13 are operatively coupled to each other and disposed in telescoping engagement with the lower jacket 12. In other words, the steering shaft 14 has a portion disposed within the upper jacket 13 and a portion disposed within the lower jacket 12. The upper jacket 13 has a portion extending into the lower jacket 12 and is translatable therein.

A telescope actuator assembly 30 is provided to facilitate powered telescope adjustments of the upper jacket 13 and the steering shaft 14. The telescope actuator assembly 30 includes a leadscrew 32 having a nut 34 threaded thereto. A motor 36 drives the leadscrew 32 to translate the nut 34 therealong. The nut 34 is operatively coupled to the upper jacket 13 with a drive bracket 38, such that linear movement of the nut 34 along the leadscrew 32 in the direction referenced with T drives the upper jacket 13 to and from different telescope positions.

Figure 2:
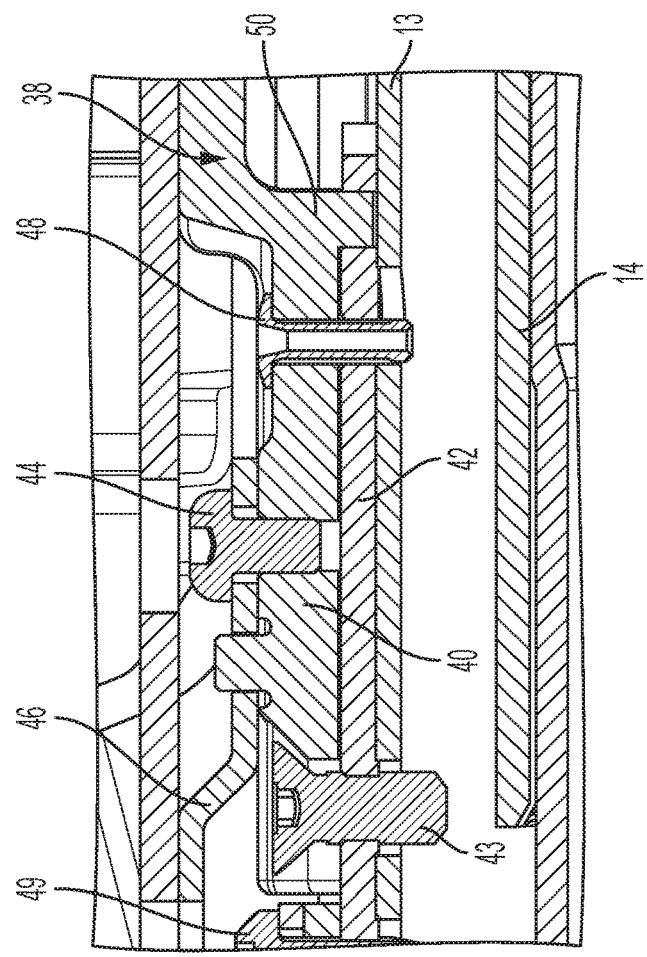
FIG. 2 is a cross-sectional view of a portion of the telescope actuator assembly.

Referring now to FIG. 2, the drive bracket 38 connection to the upper jacket 13 is shown in greater detail. In particular, the drive bracket 38 includes a base portion 40 that is coupled to a plate 42. The plate 42 is welded to the upper jacket 13 in some embodiments, but other securing processes are contemplated. The plate 42 provides additional material thickness to better facilitate mechanical fastening of the drive bracket 38—and/or possible other components—to the upper jacket 13. The base portion 40 of the drive bracket 38 may be fastened to the plate 42 and upper jacket 13 with bolts, rivets or the like. In the illustrated embodiment, a flathead screw 43 couples the drive bracket 38, the plate 42 and the upper jacket 13. A pan head screw 44 secures an energy absorption strap(s) 46 to the drive bracket 38. Additional fasteners, such as those referenced with numerals 48 and 49 are additional coupling locations.

Referring again to FIG. 1, the telescoping movement in direction T may transfer a lateral force vector L to the pan head screw 44 (FIG. 2) as the drive bracket 38 pivots around the flathead screw 43. To avoid having this lateral force result in failure and release of the pan head screw 44, a force countering feature is provided, as described herein.

Figure 3:
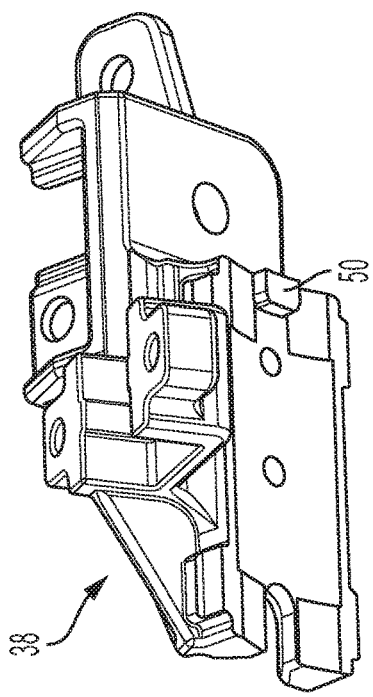
FIG. 3 is a perspective view of a telescope drive bracket.
Figure 4:
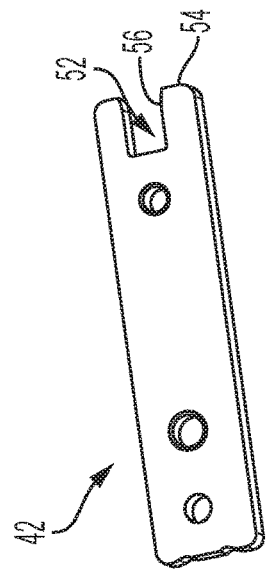
FIG. 4 is a perspective view of a weld plate.

Referring to FIGS. 2-4, the drive bracket 38 includes a tab 50 extending radially inwardly from the base portion 40. The tab 50 is positioned within a slot 52 defined by the plate 42. The slot 52 extends from an open end 54 of the plate 52. The tab 50 interfaces with the wall(s) 56 that define the slot 52 in the plate 42 to prevent lateral movement and loading of the pan head screw 44. The tab 50 may be press fit within the slot 52 to have an interference fit with the slot wall(s) 56. Although the interaction between the tab 50 and the slot wall(s) 56 prevents rotation of the drive bracket 38, the upper jacket 13 and the weld plate 42 may release in an axial direction from the drive bracket 38 and translate during a collapse event of the steering assembly 10, which allows energy absorption with the energy absorption strap(s) 46 during such an event.

Figure 5:
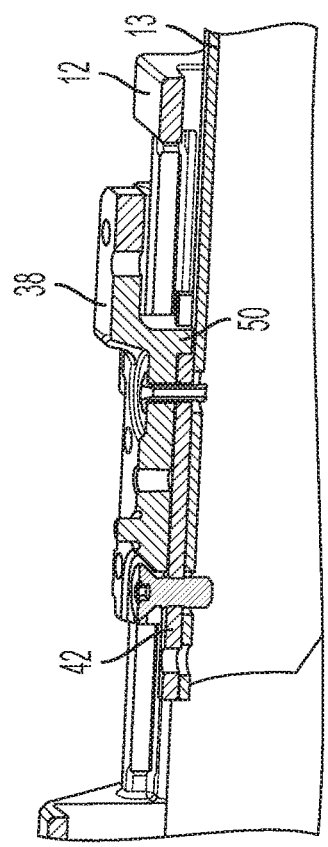
FIG. 5 is a perspective view of the steering column assembly in a first position during a collapse event.
Figure 6:
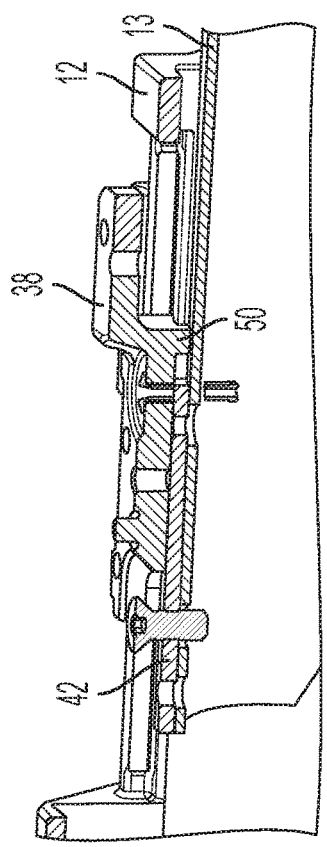
FIG. 6 is a perspective view of the steering column assembly in a second position during a collapse event.
Figure 7:
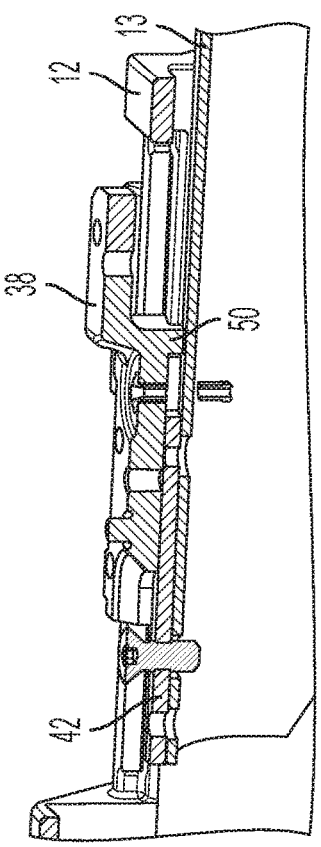
FIG. 7 is a perspective view of the steering column assembly in a third position during a collapse event.

Referring to FIGS. 5-7, a sequence of positions of the steering column assembly 10. FIG. 5 illustrates the steering column assembly 10 prior to initiation of a collapse event. In this position, the tab 50 is still positioned within the slot 52 to prevent rotation (i.e., pivoting) of the drive bracket 38 during normal powered telescoping operation, thereby avoiding damage to the pan head screw 44. FIGS. 6 and 7 illustrate the steering column assembly 10 during a collapse event. During the collapse event, the upper jacket 13 and the plate 42 translate parallel to the column axis X further into the lower jacket 12. The drive bracket 38 remains stationary to retain the energy absorption strap(s) 46 to ensure desired functionality.

FIG. 6 shows the steering column assembly 10 upon initiation of the collapse event, illustrating that the upper jacket 13 and the plate 42 are allowed to translate axially, while the drive bracket 38 remains stationary. FIG. 7 shows a continuation of the collapse, relative to FIG. 6. In this position, the tab 50 is clear of the mating parts (i.e., the plate 42) and does not impede collapse of the steering column assembly 10.

While the invention has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly comprising:
    a lower jacket;
    an upper jacket in telescoping engagement with the lower jacket;
    a telescope actuator assembly;
    a drive bracket operatively coupled to, and translated by, the telescope actuator assembly, the drive bracket having a base portion coupled to the upper jacket to move the upper jacket in a telescope direction relative to the lower jacket;
    a plate coupled to an outer surface of the upper jacket and disposed between the base portion of the telescope drive bracket and the upper jacket, the plate defining a slot extending from an open end of the plate; and
    a tab extending radially inwardly from the drive bracket and disposed within the slot to prevent pivoting of the drive bracket.

2. The steering column assembly of claim 1, wherein the tab is press fit within the slot to be in an interference fit with one or more slot walls defining the slot.

3. The steering column assembly of claim 1, wherein the plate is welded to the upper jacket.

4. The steering column assembly of claim 1, wherein the drive bracket, the plate, and the upper jacket are coupled to each other with a mechanical fastener.

5. The steering column assembly of claim 4, wherein the mechanical fastener is a flathead screw.

6. The steering column assembly of claim 4, wherein the drive bracket is coupled to an energy absorption strap with a pan head screw.

7. The steering column assembly of claim 6, wherein the tab prevents pivoting about the mechanical fastener during telescoping motion of the upper jacket.

8. The steering column assembly of claim 1, wherein the telescope actuator assembly comprises:
    a motor;
    a leadscrew driven by the motor; and
    a nut in threaded engagement with the leadscrew, the nut moveable along the leadscrew to drive the drive bracket in the telescope direction.

9. A steering column assembly comprising:
    a column jacket;
    a drive bracket movable in a telescope direction, the drive bracket coupled to the column jacket to move the column jacket in the telescope direction;
    a plate operatively coupled to the column jacket and operatively coupled to the drive bracket, the plate defining a slot extending from an open end of the plate; and
    a tab disposed within the slot to prevent pivoting of the drive bracket.

10. The steering column assembly of claim 9, wherein the tab is press fit within the slot to be in an interference fit with one or more slot walls defining the slot.

11. The steering column assembly of claim 9, wherein the plate is welded to the column jacket.

12. The steering column assembly of claim 9, wherein the drive bracket, the plate, and the column jacket are coupled to each other with a mechanical fastener.

13. The steering column assembly of claim 12, wherein the mechanical fastener is a flathead screw.

14. The steering column assembly of claim 12, wherein the drive bracket is coupled to an energy absorption strap with a pan head screw.

15. The steering column assembly of claim 14, wherein the tab prevents pivoting about the mechanical fastener during telescoping motion of the column jacket.

16. The steering column assembly of claim 9, wherein the drive bracket is operatively coupled to a telescope actuator assembly, the telescope actuator assembly comprising:
   a motor;
   a leadscrew driven by the motor; and
   a nut in threaded engagement with the leadscrew, the nut moveable along the leadscrew to drive the drive bracket in the telescope direction.

\* \* \* \* \*